United States Patent [19]
Hauber

[11] 3,749,429
[45] July 31, 1973

[54] UNIVERSAL OFFSHORE PIPELINE RISER CLAMP ASSEMBLY

[75] Inventor: Ferdinand R. Hauber, Galina Park, Tex.

[73] Assignee: Brown & Root, Inc., Houston, Tex.

[22] Filed: Sept. 22, 1970

[21] Appl. No.: 74,443

Related U.S. Application Data
[62] Division of Ser. No. 816,511, April 16, 1969.

[52] U.S. Cl. ............................................. 287/54 A
[51] Int. Cl. ............................................. F16b 7/00
[58] Field of Search ............... 287/54 B, 54 A, 54 C

[56] References Cited
UNITED STATES PATENTS

| | | | |
|---|---|---|---|
| 1,963,981 | 6/1934 | Garrett | 287/54 A |
| 1,706,214 | 3/1929 | Davidson | 287/54 B |
| 1,706,215 | 3/1929 | Davidson | 287/54 B |

FOREIGN PATENTS OR APPLICATIONS

| | | | |
|---|---|---|---|
| 829,390 | 3/1960 | Great Britain | 287/54 B |

*Primary Examiner*—Andrew V. Kundrat
*Attorney*—Burns, Doane, Swecker & Mathis

[57] ABSTRACT

A clamping apparatus having at least two sleeve-like hinged clamps which are adjustably interconnected so as to be rotatable about a common axis to provide universal freedom of movement to elements loosely clamped therein. Each sleeve-like clamp may be fitted with a toggle bolt assembly to provide ease in securing, releasing and adjusting the clamped elements. The surface of the clamps which contact the clamped elements may be lined with an electrical insulating material.

2 Claims, 5 Drawing Figures

INVENTOR
FERDINAND R. HAUBER

INVENTOR
FERDINAND R. HAUBER

UNIVERSAL OFFSHORE PIPELINE RISER CLAMP ASSEMBLY

RELATED APPLICATION

This application is a division of my prior application Ser. No. 816,511, filed Apr. 16, 1969, and entitled "Universal Offshore Pipeline Riser Clamp Assembly."

BACKGROUND OF THE INVENTION

This invention relates to offshore pipeline equipment, and in particular, to an apparatus for mounting pipe on an offshore structure unit. In its more specific ramifications, the invention is directed to a clamping means and method for adjustably securing the riser pipe of an underwater pipeline to members of an offshore platform.

Recent developments in the petroleum and gas industries have resulted in a surge of activity in the field of underwater pipe laying. Such pipeline must be laid along the floor of the sea in relatively deep water to carry petroleum and gas production from remote wells to offshore gathering platforms and, in turn, from these platforms to shore installations. The pipe used in these applications may vary in diameter from 4 inches to 48 inches and, of course, the larger the pipe size, the more difficult it is to properly attach the pipeline to an offshore structure. The end portion of a pipeline which rises substantially vertically from the floor of the sea and which must be secured or clamped to an offshore platform is characterized in the trade as a "riser pipe" or "riser."

A significant percentage of the costly delays encountered in constructing such overall pipeline installations has been directly attributed to the operation of attaching the riser pipe to an offshore unit. To be more specific, the clamps presently used to secure a riser pipe to the structure members of an offshore platform are difficult to work with and are not adapted to provide a diver with the freedom of adjustment necessary to make fast and workmanlike connections.

The current practice of making these connections is one of prefabrication and involves the welding of a series of clamps, in fixed positions, at predetermined stand-off distances from a platform cross or leg member before the platform, itself, is erected at sea. When attaching a riser pipe to the platform, if the pipe does not properly fit the stand-off clamps all the way up the leg member due to misalignment or due to a misjudged stand-off distance, or, if an attending derrick barge is positioning the riser and sea movement jostles the barge at precisely the critical moment of pipe insertion into the open clamps, damage often results and the entire operation may have to be repeated.

In practice, unsuccessful attempts are occasionally made several times before a final connection is completed. Even then, the resulting connection may be crooked and may produce undesirable local stress in both the pipe and in the clamps. Naturally, if a riser pipe is itself, bent or bowed and is forced into rigidly mounted clamps which have been prealigned for straight piping, local stress will occur in both the clamps and the riser pipe. The resulting stress concentrations encourage corrosion activity and, at the same time, increase the likelihood of mechanical failure resulting from sea movement acting upon the riser pipe.

An additional problem, which does not appear to have been heretofore recognized in the field, is the increase of electrolytic activity caused by an electrical grounding of the cathodic protection system of a pipeline through the presently used clamps to a supporting offshore structure.

It is therefore an object of the present invention to provide a clamp assembly which permits the universal adjustment of elements held therein.

It is another object of the present invention to provide a clamping assembly which may be easily installed underwater by a diver without having to first rigidly pre-mount any portion of the assembly on the supporting structure before the erection of that supporting structure.

It is still another object of the present invention to provide a universal clamp assembly for underwater applications which assembly prevents electrolytic breakdown between held elements.

It is still a further object of the present invention to provide a clamp for connecting riser pipe to an offshore platform without imposing undesired local stress on either the pipe or the clamps. It is a further object of the invention to provide a method for adjustably connecting a riser pipe with an offshore unit.

SUMMARY OF THE INVENTION

Briefly stated, the invention comprises a clamping assembly having at least two clamps rotatably connected by an intermediate member so that elements held within each clamp are provided with multi-directional freedom of pivotal movement upon loosing the clamps and rotating the clamps about the intermediate member. Both the clamps and the intermediate member may be locked in a fixed position after properly attaching the clamping member to a structure and after making any desired final adjustments.

In one feature of the invention, electrical insulation covers the clamping surfaces of the two clamps in order to electrically isolate one held element from the other.

In another feature of the invention, each clamp is provided with toggle bolt and gate hinge arrangements to facilitate clamping, adjusting, and releasing operations.

The invention further contemplates a method for connecting a riser pipe to an offshore unit using multi-directionally adjustable clamps. The clamps may be guided down a constructed riser pipe, attached, adjusted and locked in a final position. Alternatively, the clamps may be attached along an upright extension of the offshore unit and used as a guide for lowering and positioning the riser pipe. A crane may be used to support each clamp apart from the offshore unit and riser, in an estimated position with respect to both the offshore unit and the riser pipe while a diver makes all final adjustments and attachments.

DRAWINGS OF PREFERRED EMBODIMENTS

The invention is specifically pointed out and distinctly claimed in the concluding portion of the specification; however, the operation, structure, and further advantages of the preferred embodiment may be best understood by referring to the following description taken in connection with the accompanying drawings in which:

DETAILED DESCRIPTION

Figures 1, 4, 5:
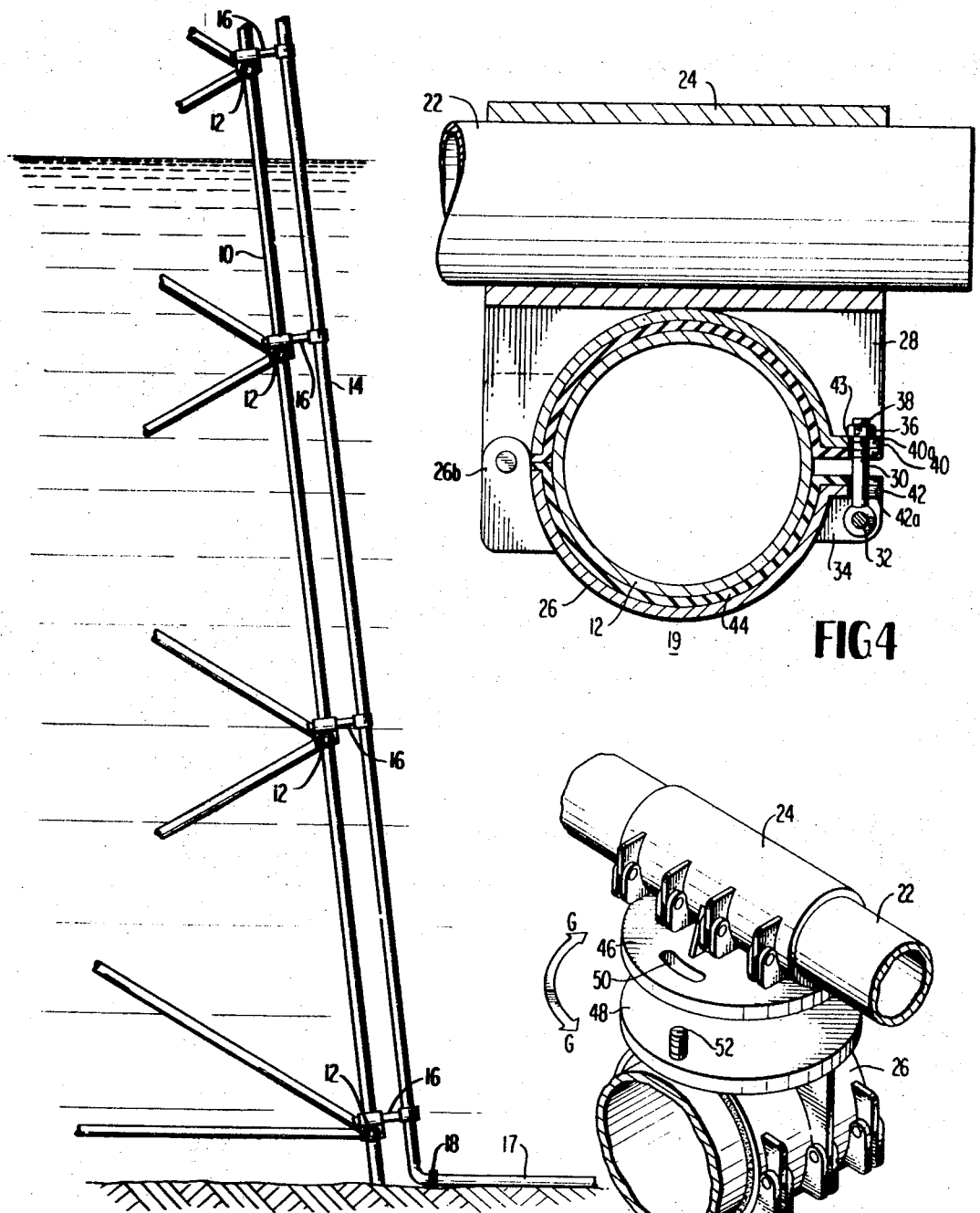
FIG. 1 shows an elevation view of a riser pipe properly secured to the cross members of an offshore platform by four clamping assemblies of the present invention.
FIG. 4 is a partial sectional elevation view of a double clamp member of the clamp assembly shown in FIG. 2 taken along line 4—4.
FIG. 5 is an isometric view of an alternative embodiment of the double clamp member shown in FIG. 4.

Referring now to the drawings, in which like numerals are used to indicate like parts throughout the various views thereof, FIG. 1 shows the jacket of an offshore platform having leg 10 and horizontal cross members 12. A riser pipe 14, having a metallic shield 15 (shown in partial cross section in FIG. 2), is attached to the platform by the clamping assemblies 16 of the present invention. The metallic shield 15 may be applied to the riser pipe 14 on the platform, itself, before constructing the riser pipe installation. Generally, the shield 15 comprises a steel shield sleeve used to protect the riser pipe from rupture and, in this configuration, gives the overall pipe a composite construction. In the specific application shown in FIG. 1, a plurality of the clamping assemblies 16 are secured to the riser pipe 14, and each one of the clamping assemblies 16 is, in turn, mounted on a horizontal cross member 12 of the platform. The riser pipe 14 is formed with a J-shaped bend at its lower end which connects with a pipeline 17 disposed on the ocean floor. A flanged member 18 is used to attach the connected pipeline adjacent to the J-bend section of the riser.

Figure 2:
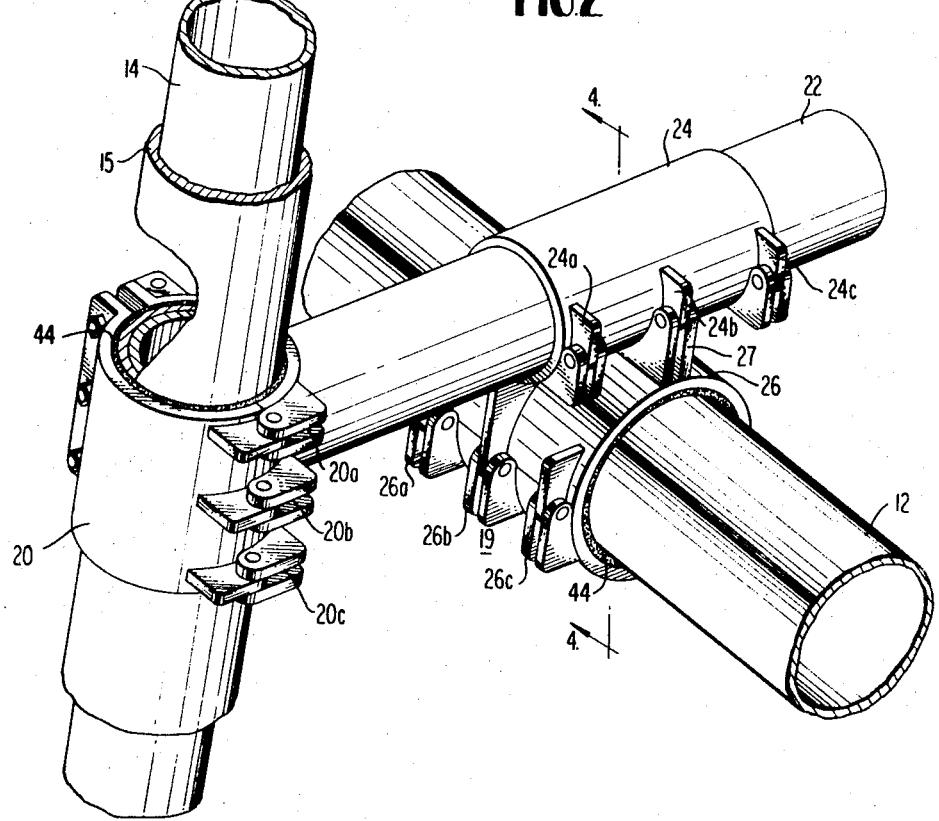
FIG. 2 is an isometric view of a preferred embodiment of the universal clamp assembly of the present invention.

FIG. 2 provides a detail view of the overall assembly of the preferred embodiment in its intended application of securing a riser pipe 14 to a platform cross member 12. As shown, this embodiment of the invention is usually mounted with its center of gravity over the cross member 12 as opposed to being supportingly hung thereunder.

The overall clamp assembly essentially comprises a double clamp member shown generally at 19, a single first clamp 20, and an interconnecting arm member 22. The arm 22 is rotatably held near one end thereof by a hollow cylindrical support member 24 of the double clamp member 19 and is rigidly mounted at the other end to the single first clamp 20. In this embodiment, the longitudinal axis of the clamp 20 is arranged normal to that of the arm member 22. The axis of the support member 24 of the double clamp 19 is arranged so as to be normal to that of both the clamp 20 and to that of a second clamp 26, which comprises one of the clamps comprising double clamp member 19. The support member 24, itself, comprises the other clamp of double clamp member 19 and, hence, may be referred to as a third clamp 24.

It can be seen that, by the above arrangement, both members 19 and 20 are rotatable about the longitudinal axis of the arm member 22. The first clamp 20 is used to make a first connection with the riser 14 while the clamp 26 is used to make a second connection with the platform cross member 12. It should be noted that the clamp 20 need not be secured before securing the clamp 26 merely because the former is referred to as a first clamp. Clamp 24 and the arm 22 supported therein comprise what is referred to as an intermediate member used to rotatably connect the clamps 20 and 26.

As shown in FIG. 2, the double clamp 19 consists of the two sleeve-like clamps 24 and 26 which are integrated into a single member by a connecting web plate 28. The plane of web plate 28 is normal to the longitudinal axis of the clamp 26 and is coincident with the axis of the clamp 24.

Each clamp 20, 24 and 26 comprises a pair of hollow, generally semi-cylindrical members, which are transversely, pivotally connected, respectively, by three conventional hinges 20a, 20b, 20c and 24a, 24b, 24c and 26a, 26b and 26c.

A lower portion 27 of the hinge 24b is welded to both the lower semi-cylindrical member of clamp 24 and to the upper such member of clamp 26 and is arranged in a plane normal to the web plate 28. By such an arrangement, the portion 27 of the hinge 24b cooperates with the web plate 28 to form a rigid cross-interlocking construction which provides substantial transverse strength to the cross-connection between the clamps 24 and 26.

Figure 3:
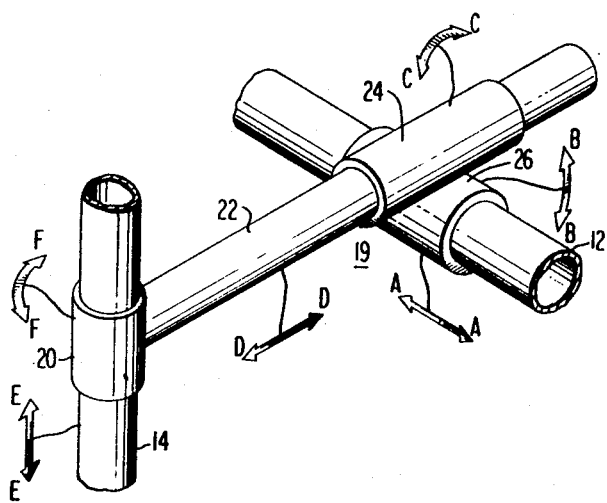
FIG. 3 is an isometric diagram showing the degrees of freedom allowed elements held within the clamping assembly shown in FIG. 2.

FIG. 3 shows the multi-directional freedom of movement available between the cross member 12 and the riser pipe 14. As shown, the double clamp member 19 may be moved linearly along the length of the cross member 12 in direction A—A which is transverse to the upright extension of the offshore platform and which permits the positioning of the riser 14 anywhere laterally along a vertical side of a platform. Consequently, the riser need not be restricted to a position immediately adjacent a leg member 10, but may be mounted intermediate any two leg members which are connected by a cross member. It should also be understood that the clamp assembly of the present invention need not be attached to a horizontal member of a platform but may be attached to a substantially vertical leg member or to a diagonal member if such member be conveniently located and of sufficient strength to offer the necessary support, if so desired.

By rotating the double clamp member 19 about the axis of the cross member 12, in direction B—B, the riser may be rotated within its axial plane so as to adjust the angle of the riser axis with respect to the ocean floor and also with respect to the upright extension or batter of the offshore platform.

When the arm member 22 is loosely held within member 24, it is rotatable therein about its own axis. It should be noted therefore, that the intermediate arm member 22 defines the general axis of the overall clamp assembly, in that the remaining elements of the assembly (i.e., double clamp member 19 and the clamp 20) are rotatable about the axis thereof in direction C—C.

This freedom of movement in direction C—C permits a diver to rotate the riser 14 within its axial plane about the axis of the arm member 22. Consequently, the angle of the riser axis with respect to the ocean floor may be adjusted in a plane generally parallel to the side of an offshore platform and to the upright extension or batter thereof.

When the arm member 22 is loosely held within clamp member 24, it also provides freedom of movement to the riser 14 in the inward/outward direction D—D. The standoff distance between the platform and the riser 14 may thusly be adjusted at increments along the upright extension or batter of the platform.

The clamp 20 adjustably holds the riser 14 therein so as to permit the riser freedom of movement in the lineal direction E—E and also in the rotational direction F—F about the axis thereof. Adjustment in direction E—E permits a diver to position the clamp 20 linearly (generally vertically), along the riser pipe 14 which adjustment may become necessary when adjusting the riser pipe in direction B—B. Likewise, in some installations, the clamp 20 may be used as a guide for sliding the riser 14 down therethrough after properly locking the remaining clamping members with each other and with the appropriate structural members of the platform. Rotating the riser pipe 14 within clamp 20 in direction F—F is often necessary when threadedly engaging two sections of riser pipe upon construction of an overall installation.

FIG. 4 provides a partial cross sectional view of the double clamp member 18, as shown in FIG. 2, taken along a line perpendicular to the axis of the cross member 12 and coincident with the axis of the arm 22. As has been mentioned in the background material of the specification, it is important to be able to properly secure riser pipe clamps with relative ease in underwater applications. To aid a diver in performing this difficult operation, the present invention contemplates locking the semi-cylindrical members of clamps 20, 24 and 26 through the use of quick release toggle bolt assemblies mounted on the clamps 20, 24 and 26 with one toggle bolt assembly mounted opposite each hinge.

Each toggle bolt assembly, as exemplified in FIG. 4, includes a bolt 30 pivotally secured to each associated clamp 20, 24 and 26 by means of a pin 32 inserted through the bolt 30 and through a projection 34 formed on the lower semi-cylindrical member of each associated clamp. A nut 36 is provided which may be made non-removable from the bolt 30 by expanding the end 38 of the bolt 30 after the nut has been turned down a few threads. The expansion may be accomplished by merely hammering the end 38 of the bolt 30 so that the diver cannot accidentally entirely remove the nut 36 from the end of the bolt 30 while loosening a clamp connection for an adjustment.

Slots 40a and 42a are provided in flanges 40 and 42, respectively. These slots are formed on the non-hinged or "free" longitudinal edges of each of the semi-cylindrical members of the clamps 20, 24 and 26. The slots are configured so that the bolt 30 is in proper locking position when it is fully inserted and contacts flush against the closed end 43 of the slot 40a. Of course, the slot could be made wider at the mouth in order to facilitate the insertion of the bolt 30.

An electrical insulator liner 44, (e.g., neoprene) may be attached by vulcanizing to the contact surfaces of the clamps 20 and 26 which are to make first and second connections with the riser pipe 14 and the cross member 12, respectively, (see FIG. 2). The purpose of the liner 44 is to insulate a pipeline from the mounting offshore platform so as to prevent corrosion due to the grounding of a cathodic protection system of the pipeline.

FIG. 5 shows an alternative embodiment of the present invention which is directed to a modification with respect to the double clamp member 19 exemplified in FIG. 2. In this modification, the clamps 24 and 26 are themselves, rotatably connected with respect to each other about an axis normal to their respective axes. For this purpose, two disc-like plates 46 and 48 are provided and are welded to the bottom of clamp 24 and the top of clamp 26, respectively. The plates 46 and 48 are disposed in slidable engagement with the upper surface of plate 48 supporting the undersurface of plate 46. The plates comprise what is referred to as a second intermediate member used for rotatably connecting the clamps 24 and 26.

The plate 46 is formed with two arcuate slots 50 (only one slot shown) located 180° apart and coincident with a minor concentric circle described within the circumference of the outer periphery of the plate 46. The plate 48 is provided with two threaded studs 52 (only one stud shown) mounted perpendicular to the plane of the plates 46 and 48 and arranged to slidably fit within the arcuate slots 50.

The clamps 24 and 26 are fitted with the same hinge gate and toggle bolt assemblies as in the embodiment shown in FIGS. 2 and 4. Neoprene lining 44 may likewise be used in this alternative embodiment as in the embodiment shown in FIG. 2, to electrically isolate the platform cross member 12 from the riser pipe 14.

In underwater applications, a diver may rotate the clamps 24 and 26 through the arc described by the slots 50 while adjusting the overall clamp assembly. This arrangement provides an additional degree of freedom, G—G about an axis normal to that of both clamps 24 and 26. If it should be desired to position the riser pipe 14 laterally beyond the length of the cross member 12, the arm 22 may be cocked to the side to describe any desired angle with respect to the axis of the cross member and thereby the support provided by the arm 22 may be projected beyond the lateral extension of the cross member 12.

TECHNIQUES FOR MOUNTING RISER PIPE ON OFFSHORE UNITS

When making a riser connection using an apparatus according to the present invention, a diver is provided with a great degree of flexibility. Using one technique, the clamp assemblies may be roughly pre-installed at estimated positions along each length of riser pipe section as the pipe is being installed. After the completed overall riser has been properly placed in a rough final position with respect to the offshore platform, the diver can make the necessary fine adjustments.

Alternatively, a crane may be used to post-install the clamp members by lowering each clamp assembly to the diver. The crane, thereby, supports the assemblies in a roughly estimated position with respect to both the platform and the overall riser pipe and the diver makes the final adjustments. The crane may be mounted on the offshore platform, itself, or may be carried by an attending derrick barge.

Using another technique, the riser pipe, itself, may be used as a guide for sliding the clamp assemblies down to a diver by loosely attaching the clamp member 20 of each clamp assembly to the riser. Conversely, a plurality of clamp assemblies may be attached to a platform along the upright extension thereof and the clamp member 20 of each clamp assembly used as a means for guiding an entirely constructed length of riser pipe down into an estimated position. The diver then, as in the above-mentioned techniques, makes the final adjustments.

After the pipe and the clamp assemblies of the present invention have been roughly positioned and after the diver has determined what adjustments are to be made, the overall riser and associated clamp assemblies may be easily worked to a final position. If the riser must be rotated axially with respect to its own axis and parallel to the upright extension of the platform, the diver must loosen the clamp members 24 to rotate the arm 22, and must also loosen the clamp members 26 at the top and bottom cross members 12 of the platform in order to slide the assemblies at these positions linearly along the cross members 12 in opposite directions, respectively, at the top and bottom.

To rotate the riser axially with respect to its own axis in a direction perpendicular to the platform, the clamp members 24 at the top and bottom of the riser must be loosened and the arms 22 held therein moved inward and outward at the top and bottom with respect to the platform, respectively. After this adjustment, it may also be necessary to rock each clamp assembly about the axis of the associated cross member 12 to align the clamp members 20 with respect to the new angle described by the axis of the adjusted riser. This operation would be especially helpful it it were determined that the J-bend portion of the riser at the bottom thereof need be moved inward or outward for a connection with the pipeline 17 or with the clip-like member 18.

The riser may be moved axially up or down the upright extension of the platform or rotated about its own axis by loosening the clamps 20 and appropriately moving the riser therein. This adjustment is especially useful in threadedly engaging sectional lengths of pipe and in guiding the pipe vertically down into place alongside the platform.

It should be noted that, although horizontal cross members 12 are used for the purpose of explaining the preferred embodiment, the members 12 may be oriented in any direction (e.g., diagonally, vertically or horizontally). Likewise, when clamping very large riser pipes (e.g., 30 inches OD and larger), it may be desirable to clamp the single clamp 20 onto a leg member 10 and the clamp 26 onto the riser. This is the reverse of the connection shown in the preferred embodiment and is used when stronger, stiffer support is needed from the jacket. Similarly, it should be understood, that in adjusting the riser after roughly positioning the clamp assemblies, all the clamps 20, 24 and 26 may be loosened on all the assemblies and the diver, with the power of the derrick barge crane, may then rock the riser into any attitude desired, and end up with a straight alignment of clamps free of locked in stresses.

It can thus be seen that a clamp assembly and a method for using the assembly have been herein described which assembly provides a universal adjustment capability with respect to elements clamped therein. The locking and hinging features of the clamp assembly make it especially useful in underwater applications where a diver must make pipe connections without the benefit of a substantial amount of auxiliary alignment equipment. Since the assembly may be installed at sea, the present invention precludes the need for prefabricating the structural members of an offshore structure with rigidly mounted clamps before the offshore structure, itself, is erected at sea.

If the pipe should become bowed or bent due to the interaction of the sea on the riser pipe, the clamp assembly of the present invention may be adjusted to compensate which will thus prevent the buildup of undesirable local stress and help avert the eventual failure of the clamping assemblies. The incidence of mechanical failure and the degree of corrosion due to stress concentrations are thereby reduced.

Through the use of the present invention, riser pipe may be constructed at sea in common pipe length sections or an entire length of riser pipe may be guided down the side of an offshore structure along any upright extension thereof, and not necessarily along a leg member. With the overall flexibility provided, safer and faster pipe laying operations are possible. Further, by lining the contact surfaces of the clamp assembly with an electrical insulator, the grounding of a pipeline cathodic protection system from a pipeline to an offshore structure is precluded.

While what has been shown is a preferred embodiment of the invention and one modification thereof, it is, of course, understood that various modifications and changes may be made therein without departing from the substance thereof and so it is intended to cover in the following claims all such devices as fall within the true spirit and scope of the present invention.

What I claim and seek to obtain by Letters Patent of the U.S. is:

1. A clamping assembly comprising:
   a first clamp including,
     a pair of hollow generally semi-cylindrical members,
     a plurality of hinge means mounted between said semi-cylindrical members for transversely pivotally connecting said semi-cylindrical members,
     a plurality of toggle bolt means operatively mounted upon said first clamp opposite said plurality of hinge means whereby said first clamp may be opened to transversely receive the placement of a first member to be held and then rigidly locked onto the first member and whereby said first clamp may be loosened to permit relative rotation and translation of said first clamp with respect to said first member to be held,
   a second clamp including,
     a pair of hollow generally semi-cylindrical members,
     a plurality of hinge means mounted between said semi-cylindrical members for transversely pivotally connecting said semi-cylindrical members,
     a plurality of toggle bolt means operatively mounted upon said second clamp opposite said plurality of hinge means whereby said second clamp may be opened to transversely receive the placement of a second member to be held and then rigidly locked onto the second member and whereby said second clamp may be loosened to permit relative rotation and translation of said second clamp with respect to said second member to be held;
   an intermediate member for connecting said first and second clamps for relative rotation and translation including,
     an arm member connected at one end to said first clamp, and
   a third clamp including,
     a pair of hollow generally semi-cylindrical members,
     a plurality of hinge means mounted between said semi-cylindrical members for transversely pivotally connecting said semi-cylindrical members,
     a plurality of toggle bolt means operatively mounted upon said third clamp opposite said plurality of hinge means whereby said third clamp may be opened to surround and rigidly hold said arm member generally at the other end thereof and whereby said third clamp may be loosened to permit rotation and translation of said third clamp with respect to said arm member;

means for integrating said second clamp with said third clamp including,
a web plate interconnecting one of the semi-cylindrical members of said second and said third clamps, said web plate being fixedly connected to said second and third clamps in a posture normal to the longitudinal axis of one of said second and third clamps and coincident with the axis of the other of said second and third clamps, and
interlocking means interconnecting said one of the semi-cylindrical members of said second and third clamps, said interlocking means being fixedly connected to said second and third clamps in a posture perpandicular with respect to said web plate, said interlocking means and said web means cooperating to form a rigid cross-interlocking construction which provides substantial transverse strength to the cross connection between said second and third clamps;

said plurality of toggle bolt means operatively mounted upon said second and third clamps each including,
a bolt pivotally secured to the other of said semi-cylindrical members of said clamp which is free to pivot with respect to said means for integrating,
a corresponding slot fashioned in the corresponding semi-cylindrical member of said clamp which is fixedly positioned with respect to said means for integrating, and
means for operatively retaining said bolt within said slot, whereby said plurality of toggle bolt means mounted upon said second and third clamp assemblies swing inwardly toward said means for integrating said second and third clamps for permitting said second and third clamps to be readily operatively manipulated.

2. A clamping assembly including:
a first clamping including,
a pair of hollow generally semi-cylindrical members,
a plurality of hinge means mounted between said semi-cylindrical members for transversely pivotally connecting said semi-cylindrical members,
a plurality of toggle bolt means operatively mounted upon said first clamp opposite said plurality of hinge means whereby said first clamp may be opened to transversely receive the placement of a first member to be held and then rigidly locked onto the first member and whereby said first clamp may be loosened to permit relative rotation and translation of said first clamp with respect to said first member to be held,
a second clamp including,
a pair of hollow generally semi-cylindrical members,
a plurality of hinge means mounted between said semi-cylindrical members for transversely pivotally connecting said semi-cylindrical members,
a plurality of toggle bolt means operatively mounted upon said second clamp opposite said plurality of hinge means whereby said second clamp may be opened to transversely receive the placement of a second member to be held and then rigidly locked onto the second member and whereby said second clamp may be loosened to permit relative rotation and translation of said second clamp with respect to said second member to be held;
a first intermediate member for connecting said first and second clamps for relative rotation and translation including,
an arm member connected at one end to said first clamp, and
a third clamp including,
a pair of hollow generally semi-cylindrical members,
a plurality of hinge means mounted between said semi-cylindrical members for transversely pivotally connecting said semi-cylindrical members,
a plurality of toggle bolt means operatively mounted upon said third clamp opposite said plurality of hinge means whereby said third clamp may be opened to surround and rigidly hold said arm member generally at the other end thereof and whereby said third clamp may be loosened to permit rotation and translation of said third clamp with respect to said arm member;
a second intermediate member connecting said third clamp to said second clamp, including,
a first plate secured on a first side to said second clamp,
the plane of said first plate being parallel to the longitudinal axis of said second clamp,
a second plate secured on a first side to said third clamp,
the plane of said second plate being parallel to the longitudinal axis of said third clamp,
a second side of said first plate being fashioned with a smooth planar surface,
a second side of said second plate being fashioned with a smooth planar surface,
the second sides of said first and second plates being operatively juxtaposed for rotational movement about a common central axis lying normal to said first and second plates and
means for locking said first plate and said second plate against relative rotational movement therebetween including,
at least two arcuate slots formed in one of said first and second plates, the centerline of said arcuate slots being formed along the circumference of a circle described about the substantially central axis of said first and second plates and wholly within the outer periphery of said one of said first and second plates,
a plurality of threaded stud means formed in the other of said first and second plates and corresponding in number to the number of said arcuate slots,
said threaded stud means being positioned on the other of said first and second plates with the axes of said stud means being substantially normal to the plane of the other of said first and second plates and compatibly arranged for engagement through said arcuate slots, and
said plurality of threaded stud means being thus arranged to releasably join or permit limited movement within said arcuate slots as said first and second plates are rotated with respect to each other about the central axis normal to both said first and second plates.

* * * * *